Aug. 13, 1935.　　　　J. G. CAPSTAFF　　　　2,011,352
METHOD AND APPARATUS FOR COPYING MOTION PICTURE FILMS
Filed June 24, 1933

Inventor:
John G. Capstaff,
By Newton M. ───
Rolla N. Carter
Attorneys.

Patented Aug. 13, 1935

2,011,352

UNITED STATES PATENT OFFICE 2,011,352

METHOD AND APPARATUS FOR COPYING MOTION PICTURE FILMS

John G. Capstaff, Rochester, N. Y., assignor to Eastman Kodak Company, Rochester, N. Y., a corporation of New York Application June 24, 1933, Serial No. 677,427

5 Claims. (Cl. 88—24)

This invention relates to a method of copying projectible pictures and particularly to the re-photographing of a projected picture as part of a scene of another motion picture.

There are numerous instances in which it is desirable to include in a motion picture, scenes which are not readily available at the place where the action or posed part of the picture is most conveniently provided. This may be accomplished by reproducing at the studio the desired setting or by photographing the actual surroundings and projecting the resulting picture in proper relation to the action or other part to be added to form a composite picture.

It is an object of this invention to provide a method of photographing either alone or combined with other material a projected picture without the projector and camera being synchronized or mechanically or electrically coupled. Another object of this invention is to provide a method whereby projected pictures may be photographed so as to give approximately equal exposure to all frames and thereby remove the objectionable flicker generally arising from the stroboscopic nature of the exposure.

Other objects and advantages of this invention will be readily apparent from the following description when read in connection with the accompanying drawing and its scope will be pointed out in the appended claims.

Figure 1:
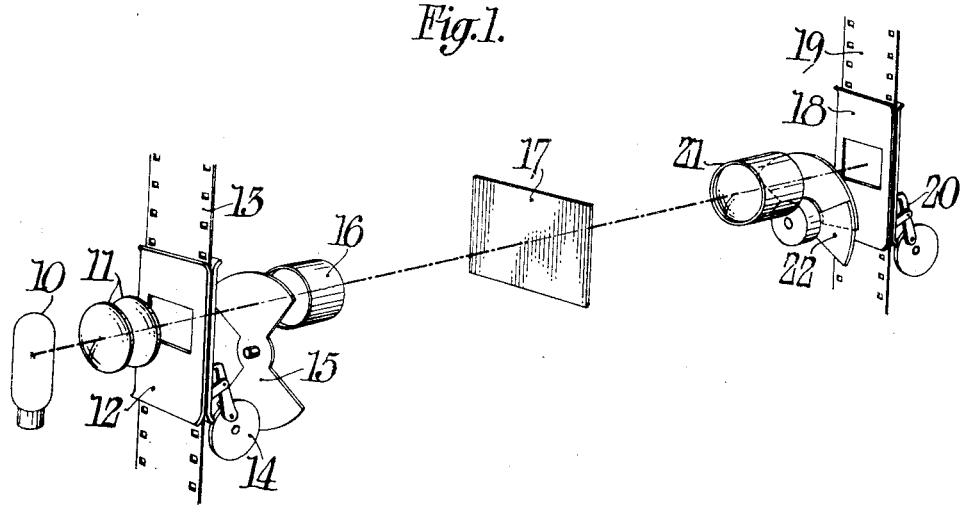
Figure 2:
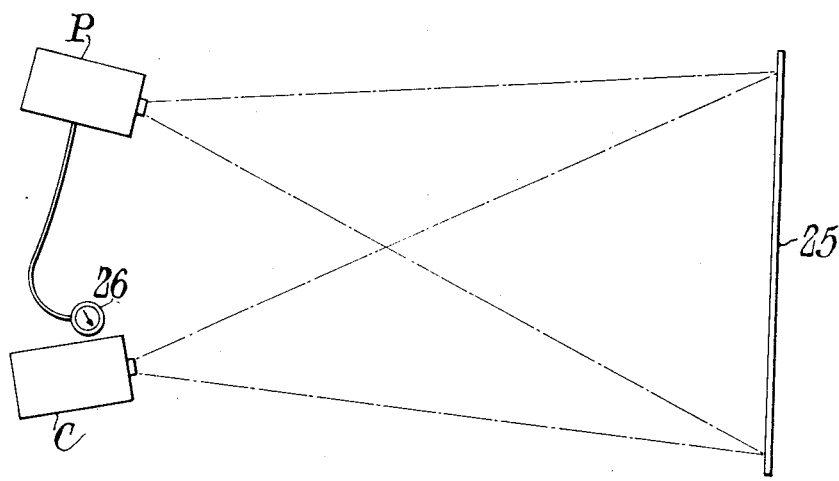

In the drawing Fig. 1 is a perspective view, diagrammatically shown, of a system for copying by projecting a picture upon a translucent screen and photographing the projected picture by transmitted light; Fig. 2 is a schematic view showing the picture projected upon an opaque screen and photographing the projected picture by reflected light.

In the systems shown in Figs. 1 and 2 the pictures to be copied are projected on a screen and the projected picture is then photographed either by transmitted or reflected light as desired. If the shutter of the projector has N blades placed equal angles apart and the opening of the camera shutter is A, then, in order that all frames receive equal exposure irrespective of what relative positions the shutters of the projector and camera occupied at the beginning of the exposure it is necessary that the camera shutter rotate an angle A in the same time the projector shutter rotates through an angle $$\frac{2\pi}{N}.$$

Now if the speed of the projector be U and that of the camera be V; the necessary relation expressed mathematically is $$\frac{U}{V}=\frac{2\pi}{NA}.$$

When the above relationship is maintained each exposure made by the camera will include a light and dark period of the projected picture and therefore it is immaterial at what point in the cycle of the projector the camera exposure commences. In operating the system of this invention the speeds of the camera and projector ordinarily will be maintained approximately equal but not necessarily equal, the amount of permissible variation being discussed below.

Referring to Fig. 1 of the drawing the projector shown diagrammatically includes a light source 10 and condenser lenses 11 for concentrating the light on a gate 12 through which a film 13 is intermittently drawn by a pull down mechanism 14 as is well known. A shutter 15 connected in any ordinary way (not here shown) to rotate in timed relation with the pull down 14 and provided with two equally spaced blades periodically intercepts the light beam to an objective 16 which images the film 13 in the gate 12 onto a translucent screen 17. One of the blades of the shutter 15 interrupts the light during the pull down operation and the other blade serves to increase the frequency of the light and dark screen periods so as to reduce flicker and is hereinafter referred to as the flicker blade.

The camera for photographing the image projected on the screen 17 may be of any standard design and is here shown in part as comprising a gate member 18 past which a sensitive film 19 is adapted to be intermittently advanced by a suitable pull down mechanism 20. An objective 21 images the screen 17 on the film 19 in the gate 18 and during movement of the film the light is interrupted by a single bladed shutter 22, the angle of which may be adjustable during use in any well known manner and which is connected to rotate in timed relation with the pull down 20. Inasmuch as the projector and camera are commercial machines their complete structures have been omitted from the drawing in the interest of clearness and simplicity.

The general operation of the system shown in Fig. 1 should be clear from the above description since the new features introduced by the present invention relate primarily to the inter-relation of the designs and speeds of the two shutters. With the projector and camera running at approximately equal speeds each frame of the picture film 13 will be imaged twice on the screen 17 with an intervening period of darkness which for convenience will be assumed to be equal and each frame on the sensitive film 19 will be exposed during one-half revolution of the shutter 15 in the projector. Now it is obvious that any 180 degree sector of the shutter 15 will contain the same amount of open sector as any other 180 degree sector and accordingly the exposure of each frame in the camera for a period equaling one half a revolution of the projector shutter 15 will result in all of the exposures of the sensitive film 19 being substantially equal.

In the arrangement shown in Fig. 2, the projector P images the film on an opaque screen 25 and this projected image is then photographed by the camera C, the working of the system being identical with that shown in Fig. 1 except that the screen 25 reflects the light to the camera rather than transmits it as does the screen 17 shown in Fig. 1.

Since in practice the camera speed is usually fixed at 90 feet a minute small changes in projector speed may be compensated by small changes in the camera shutter angle. A tachometer on the projector may have a remote indicator 26 in view of the cameraman who, if the projector speed changes slightly, may adjust manually the shutter opening in the camera.

If, as in the Mitchell camera, the shutter angle is 170 degrees and the camera speed is 90 feet a minute the projector with a two bladed shutter, blades equally spaced, must run at a speed given by $$U = \frac{2\pi V}{NA} = \frac{2\pi \times 90}{2 \times 170} = 95.3 \text{ feet per minute.}$$

A speed variation between the camera and projector up to plus or minus 5% may be tolerated. A centrifugal speed control for the projector motor can easily hold the speed well within this limit and therefore the problem of operating the camera and projector at substantially the same speed presents no practical difficulty.

It will be seen that the present invention makes possible the photographing of a projected picture without the usual mechanical or electrical coupling between the camera and projector and therefore the system of this invention is much more flexible and easier to handle than the ones in which such a coupling is necessary.

If it is desired to change in the copy film either the rate of action without changing the projection speed or the projection speed without changing the speed of action, it is only necessary to vary correspondingly the speed of the projector and the shutter angle of the camera in accordance with the principles above set forth.

By way of example, the following table has been prepared for a camera man who wishes to compensate a change in projection speed by a change in the camera shutter angle. It is assumed that the projector shutter has two blades symmetrically placed and that the camera speed is 90 feet per minute.

| Projector speed | Camera shutter angle |
|---|---|
| 90 | 180° |
| 95 | 170 |
| 101 | 160 |
| 108 | 150 |
| 116 | 140 |
| 125 | 130 |
| 135 | 120 |
| 147 | 110 |

It is to be understood that instead of manually adjusting the camera shutter angle in accordance with the reading of the tachometer, the speed of the projector may be manually controlled to keep the tachometer reading within certain prescribed limits. These limits would be such that no flicker would be notable in the final projected motion picture.

While this invention has been described in connection with a projector having a two-bladed shutter, it is to be understood that any desired number of blades may be used as long as the required relationship is made to exist between the shutters of the projector and camera as outlined above.

It is to be understood that the showing herein is largely diagrammatic and is not drawn to scale. The complete mechanical details necessary to carry out my invention would, if shown in full, tend to obscure rather than reveal the invention. In practice the screen 17 would be of considerable size and the proportions of the elements as shown are not at all accurate, the showing being merely that necessary to explain the process to one skilled in this art. In practice the arrangement shown in Fig. 1, using a translucent screen, I consider far superior to that shown in Fig. 2.

More than one projector may be used if it is desired to form a composite picture and additional material may be included in the field of view of the camera as is well known.

The invention has been described in connection with two embodiments by means of which it may be practiced. Modifications will suggest themselves to those skilled in the art without departing from the spirit of the invention, the scope of which is pointed out in the appended claims.

What I claim as new and desire to secure by Letters Patent of the United States is:

1. In the art of copying motion picture film by photographing projected images of the picture on the film, the method of producing a film having a number of frames corresponding to a certain amount of action which differs from the number of frames on the original film corresponding to the same amount of action, which method comprises intermittently moving at a uniform rate the original film, frame by frame, through a beam of light which is directed to a screen, interrupting the light beam during movement of the film and at least once during the time each frame is stationary in the beam, all of the interruptions of the beam being of the same duration and equally separated in time, intermittently moving at a uniform rate differing from the rate of movement of the original film a sensitive film step by step through an exposure position, and exposing the sensitive film to light from the screen during each period of rest between the step by step movement and for an interval of time substantially equal to the time elapsing between the beginning of one of the interruptions and the beginning of the next following interruption of said light beam.

2. In an apparatus for copying a motion picture film, constant speed means including a symmetrical two-bladed shutter for displaying successively the pictures on the film, a constant speed camera positioned to photograph said pictures as they are successively displayed and including a single-bladed shutter, the ratio between the angular opening of the camera shutter and $\pi$ radians being substantially equal to the ratio between the speeds of the camera and the displaying means.

3. The method of reproducing from a motion picture film strip having a series of image areas thereon upon another film strip in which the number of image areas corresponding to a given action is different from that in the first strip which comprises moving both strips past printing windows at rates of speed which are different with respect to the height of the respective printing windows, projecting the image at one window upon the other window, the movement of each film being intermittent, and intercepting the projection beam at each window during the movement at the respective window, the duration of a single exposure of one window being of the same magnitude as the sum of the exposure and interception at the other window.

4. The method of copying a motion picture film carrying a series of pictures which comprises projecting a plurality of times and in succession each picture of the series whereby each projection is followed by a dark period, independently making a series of single exposures on a sensitive film from the projections from the picture film, timing each exposure to equal substantially the duration of a light and dark period of the projection, and separating the exposures by substantially equal intervals of time, whereby each exposure period of the sensitive film will include equal light and dark portions of the projection regardless of the phase relation between the projections of the picture film and the exposures of the sensitive films.

5. The method of copying a motion picture film carrying a series of pictures onto a sensitive film without synchronizing the movement of the two films which comprises projecting a plurality of times and in succession each picture of the series, whereby each projection is followed by a dark period, photographing the projected pictures by making a series of exposures on a sensitive film for an interval of time substantially equal to the period covered by a light and dark period in the projected picture, and separating the exposures of said series by an equal period of time.

JOHN G. CAPSTAFF.